April 24, 1956     R. RAMSPERGER     2,742,700
ARTIFICIAL TEETH AND METHOD OF PRODUCING SAME
Filed Sept. 24, 1952     2 Sheets-Sheet 1
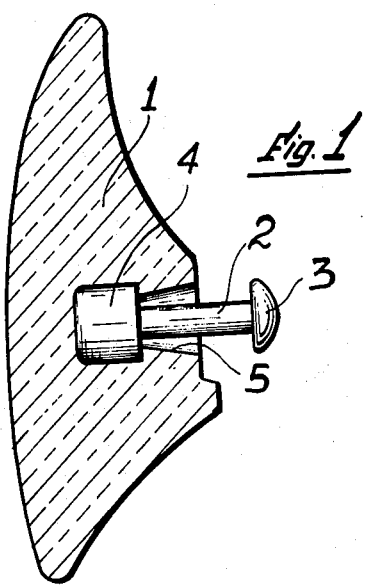
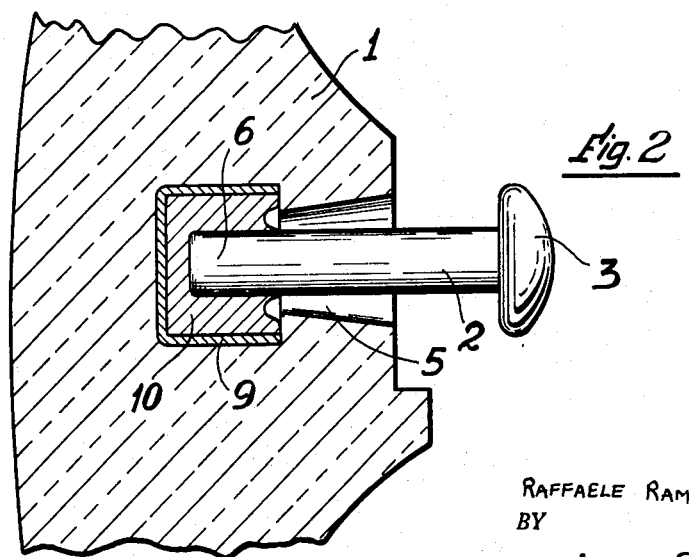
INVENTOR.
RAFFAELE RAMSPERGER
BY April 24, 1956   R. RAMSPERGER   2,742,700
ARTIFICIAL TEETH AND METHOD OF PRODUCING SAME
Filed Sept. 24, 1952   2 Sheets-Sheet 2
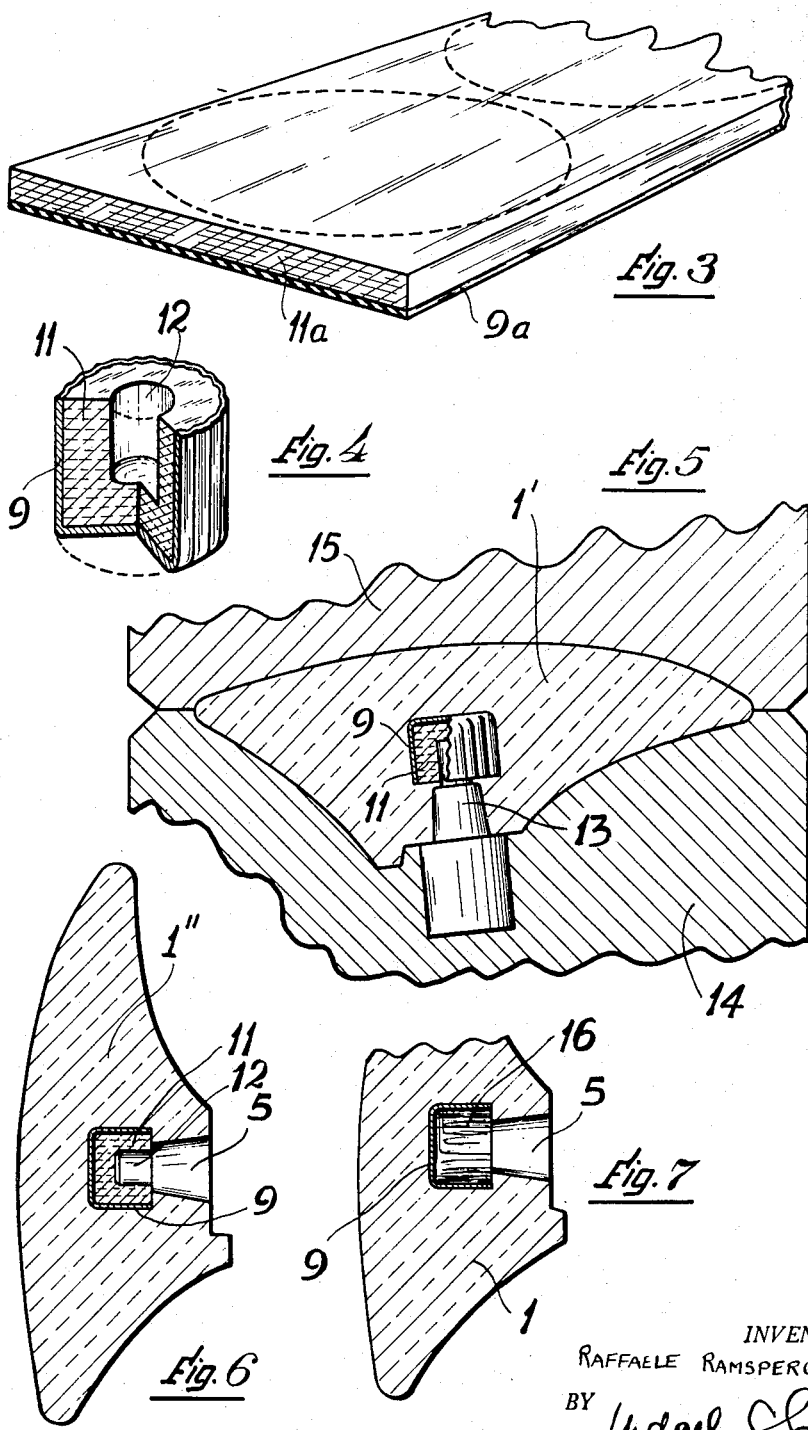
INVENTOR.
RAFFAELE RAMSPERGER

United States Patent Office 2,742,700
Patented Apr. 24, 1956

2,742,700
ARTIFICIAL TEETH AND METHOD OF
PRODUCING SAME

Raffaele Ramsperger, Milan, Italy, assignor to The Firm Fida S. p. A. Fabbrica Italiana Prodotti Odontoiatrici, Milano, Italy Application September 24, 1952, Serial No. 311,216
Claims priority, application Italy October 4, 1951
2 Claims. (Cl. 32—10)

This invention relates in general to artificial teeth and to methods for producing same and, more particularly, it relates to a method for producing artificial teeth of the type provided with anchorages to which tooth pins are soldered for retaining the teeth in vulcanite material or other denture base material, and to the artificial teeth produced thereby.

In rather more detail, this invention is directed to that class of artificial teeth wherein an anchor and preferably a pair of anchor means of proper refractory metal or metal alloy is embedded and baked in the porcelain tooth body, and a pin or respectively a pair of pins of less refractory metal or metal alloy are subsequently fitted into and soldered to said anchor means.

The general and particular characteristics of my invention and the advantages thereof will be best understood by a consideration of the status of the prior art and of the methods heretofore applied for production of articles of the character referred to above, as follows in brief:

Such artificial teeth are generally formed of a porcelain or similar composition and are provided with openings or cavities at or near the bottom of which there is embedded a metal anchorage, usually in form of an out-facing cup, to provide a metallic wall for said openings or cavities to which wall a suitable soldering material, silver for example, may be firmly joined by a heating step, direct soldering of the tooth pins to the porcelain walls not being possible. Provided that the tooth pin is deeply inserted into a metal coated opening or cavity of the said porcelain tooth body and that a suitable amount of said soldering material is inserted between the inner surface of the said metal coating forming the anchorage and the outer tooth pin surface, during the said heating step the soldering material fuses and the pin becomes firmly secured in position within the said surrounding anchorage, it being made integral therewith in a compound metallic mass or body.

By applying the most advanced knowledge in the art, a sure connection of the tooth pin to the metal anchorage may be attained by said soldering step, while a proper connection of anchorage made integral with said pin to the tooth porcelain body may be attained only by making use of a relatively thick cup shaped anchorage member. Further, the said anchorage members must be necessarily produced by making use of very precious refractory metal or metal alloy, of palladium for example, or of platinum, or of gold-palladium or gold-platinum alloys or other alloys thereof, in view of the fact that said anchorage members must be embedded inside the porcelain body prior the baking step thereof and therefore the material of said members must be resistant to intense heat during said baking step of porcelain, the required resistance including full protection against the deleterious effects due to oxidation.

From the above it will be apparent that any satisfying result in production of artificial teeth of the character referred to above is chiefly a matter of cost due to the consumption of a remarkably large amount of precious metal or metal alloy in making the said anchorage members, i. e. producing an article of the said character by applying current knowledge is pretty expensive.

Various attempts have been made heretofore to reduce the cost of production of said articles by reducing the weight of the said costly anchorage members thereof; cup shaped anchorage members having an out-turned flange forming a fore or head portion for better junction to the tooth porcelain body are currently produced, for example. Great difficulties are however encountered in the manufacture of cup anchorage members of said flanged shape as extremely thin metal sheets are used for producing the same, the excessive thinness of said metal sheets making it difficult to provide the necessary correct shape of said members in making, handling and embedding the same inside the unbaked porcelain tooth body and during the baking of the latter.

The same may be said of any attempt to reduce the weight of said costly anchorage members by reducing the size of the same, for example by using simpler ring-shaped anchors in lieu of said cup shaped members, the consequent reduction of the surface of the inner metal coating of the porcelain walls of openings or cavities of the tooth body making the soldering less satisfactory and preventing the soldering material from completely filling the space between the inner surface of said cavities and the outer surface of pin inserted therein for making the said substantially integral metallic mass embedded inside said tooth body.

Therefore, in spite of such attempts it is still general practice of manufacturers of said articles to use rather thick cup-shaped anchorage members of very precious refractory metal or metal alloy in the production of artificial teeth of the character above described, where a satisfactorily firm connection of the tooth pin to the tooth porcelain body is desired. The requirements referred to above and the manner of meeting them will be made clearer as this description proceeds, reference being had to the accompanying drawings.

Having the above said current knowledge, requirements and conditions in mind, according to my invention I provide a new and improved artificial tooth having a porcelain body of conventional character and provided with one or preferably two cavities at the bottom of which an extremely thin and consequently relatively cheap anchorage member of precious refractory metal or metal alloy is deeply and very firmly embedded, the thickness of said member being about one-fifth to one-tenth of the thickness of regular anchorage members constructed according to current art even though of the most advanced character, with tooth pins inserted into the thus metal coated cavities and firmly secured in position by a mass of soldering material within the surrounding anchorage members and made integral therewith by a conventional soldering step, the metallic body formed by combination of the tooth pin head, of the surrounding soldering material and of the further surrounding anchorage member forming an enlarged head portion of and integral with said pin expanded inside the porcelain tooth body and having a cross section substantially larger than the cross section of the outer portion or mouth of the said corresponding cavity.

Another object of my invention is to provide a new and improved artificial tooth of the character described above which comprises one or more baked-in anchorage members of precious refractory metal or metal alloy having a corrugated surface which has been proved very successful in forming firm and sure connection both with the surrounding porcelain tooth body and with the mass of the soldering material therein and made integral therewith by said soldering step.

A further object of this invention is to provide a new and improved method for producing artificial teeth having the above said useful characteristics and advantages and, in particular, for producing anchorage members made of extremely thin sheets of precious refractory metal or metal alloy, without prejudice to the metallic surface thereof and to the proper and correctly designed shape of said members in cup-shaping, handling and embedding the same in the tooth porcelain body.

A still further object of my invention is to provide a new and useful method for embedding anchorage members made of extremely thin sheets in a tooth porcelain body provided with one or more cavities wherein said metallic refractory member or members provide a metallic solderable inner coating of the porcelain walls thereof, the inner diameter of the thus metal coated cavity or cavities being substantially larger than the diameter of the outer portion or mouth of the cavity.

According to the gist of the invention, with said objects in view and other objects which will be apparent to those skilled in the art as this description proceeds, the instant invention contemplates the manufacture and the use of "compound" anchorage members which as produced are formed by the combination of an outer layer of precious refractory metal or metal alloy and of an inner layer of non-refractory, non-precious and destructible material and the embedding of said compound anchorage members in the porcelain body of the tooth prior to the baking thereof, and therefore the instant invention further contemplates the elimination of said destructible inner layer of said compound anchorage members while inside the said tooth porcelain body for having the inner surface of said outer metallic layer uncovered and thereby to expose the bare metallic walls of said cavity to which walls the soldering material may take firm hold, the full cycle of artificial teeth production comprising thereafter conventional steps of introduction of tooth pins into the thus metal walled cavities and of soldering same therein by a heating step.

In a preferred embodiment of this invention, the invention contemplates the making of said inner layer of a cheap material which may be fully burnt during the baking step of the porcelain body by the intense heat applied therethrough for having the inner surface of said outer metal refractory layer uncovered according to the gist of this invention so that said inner layer will be destroyed during said baking step. The use of plain paper sheets for making said inner layer has proved very successful.

In a most preferred embodiment of my invention, the invention contemplates further the manufacture of compound anchorage members of the novel character referred to above by punching into a cup shape an originally flat compound material produced by superimposing an extremely thin sheet of precious refractory metal or metal alloy on a rather thick sheet of destructible non-refractory and non-precious material, preferably of the example above given, the contraction of said compound material from its original flat shape to a final cup shape causing the cup sidewall portion of said material to become corrugated.

These and other objects, features and advantages of this invention and the mode for carrying out the same will be clearly understood from a consideration of the following more detailed description thereof, when taken in conjunction with the accompanying drawings, wherein:

Figure 1 is a vertical longitudinal sectional enlarged view through an artificial tooth having a cup shaped pin anchorage member and a tooth pin soldered therein, the said anchorage member and pin being shown in side elevation, the artificial tooth shown being producible by the method according to the present invention.

Figure 2 is a similar view in greatly enlarged scale through the same artificial tooth and through the anchorage member thereof, the latter being shown as constructed according to the present invention.

The principal starting materials and steps of the method according to this invention for producing a novel and improved artificial tooth of the type shown in Figs. 1 and 2 are shown in Figs. 3 to 7 as follows:

Figure 3 is a perspective view in a very greatly enlarged scale of a portion of a compound flat material from which compound corrugated anchorage members according to this invention may be produced by a punching step, and Figure 4 is a perspective partly sectional view of an anchorage member of compound and corrugated type according to the invention that may be produced from material of Fig. 3.

Figure 5 is a vertical sectional view through the porcelain body prior to its baking, during the shaping step thereof into a conventional mould and in which a compound anchorage member according to the invention and as shown in Fig. 4 is embedded, said member being shown partly in elevation and partly in section.

Figure 6 is a vertical sectional view of the artificial tooth prior to baking and as produced by the moulding step shown in Fig. 5, and Figure 7 is a fragmentary similar view of same, upon baking and consequent destruction of the inner layer of the compound anchorage member thereof, i. e. ready to receive the tooth pins and to be subjected to the said soldering step.

Throughout the several figures, like reference numerals indicate like parts and, in general reference numeral 1 indicates the tooth porcelain body, numeral 2 indicates a tooth pin connected thereto and numeral 3 the enlarged head portion of said pin, designed to be encased into the vulcanite material or other dental base material for connecting the artificial tooth thereto.

Referring first to Fig. 1: in a more general way and according to current knowledge in the art the fore portion, opposite to head 3, of a tooth pin 2 of any suitable conventional type and material may be firmly secured in position within a tooth porcelain body 1, as heretofore known, by providing said fore portion with an enlarged metallic part 4 dimensioned and shaped to be deeply encased inside said porcelain body 1, and chiefly extending radially into the side walls of a cavity thereof, so that the diameter of said metallic part 4 is substantially larger than the diameter of the mouth 5 of said cavity, thus preventing the said pin 2 from being pulled out from said porcelain body. Said enlarged part 4 is produced by soldering said tooth pin fore portion inside an anchorage member previously embedded into said porcelain body 1, prior to baking the same and provided that said anchorage member is cross-sectionally larger than said mouth 5 of the cavity, through which mouth said pin must be inserted upon baking of porcelain.

According to current art, the embedding of the anchorage member in the porcelain body 1 is performed by moulding the unbaked porcelain material, in plaster form, into a proper mould wherein the said anchorage member is supported by a suitable supporting pin having the shape of said mouth 5 and which upon moulding is drawn out from said porcelain body through said mouth 5. Consequently, an anchorage member constructed and embedded according to current art provides a metal-walled hollow in said porcelain body 1 the diameter of which nearly corresponds to diameter of fore portion of said supporting pin, i. e. the diameter of said hollow may not be greater than the diameter of said mouth 5 through which said supporting pin must be drawn out upon completion of the moulding step.

An improved artificial tooth having an enlarged part 4 dimensioned as shown in Fig. 1 and produced according to the instant invention is shown in Fig. 2, wherein a very thin refractory metallic coating of the cavity is illustrated at 9, the said thin coating 9 having an inner diameter substantially larger than the diameter of said mouth 5 of said cavity.

According to said Fig. 2, the said thin refractory metallic coating 9 is firmly connected to said fore end portion 6 of tooth pin 2 by a relatively thick layer 10 made of soldering material introduced and fused in the space between said coating 9 and said fore end portion 6 of tooth pin 2, the soldering material taking firm hold of the inner surface of coating 9 and the outer surface of the tooth pin 2 respectively, thereby having said coating 9 made practically integral with said tooth pin 2. In effect, in an artificial tooth of my novel and improved type, the anchorage members may be considered as made by the metallic mass formed by the combination of a very thin outer refractory metallic coating and of an inner relatively thick layer of soldering material, the thickness of the latter causing the said anchorage members to be radially expanded a substantial extent within the mass of the porcelain body of the tooth in lieu of the thickness of the refractory anchor in an artificial tooth of current type and manufacture.

At this point it will be easily understood that an improved artificial tooth produced according to this invention will be considerably less expensive than an artificial tooth made according to current art, in view of the very great reduction of the amount of costly refractory material comprised therein, and further that a novel artificial tooth having the general features shown in Fig. 2 is far more satisfactory than the current ones, owing to the fact that the depth of the anchorage members thereof in the porcelain mass of the tooth body, due to the thickness of the layer of relatively cheap soldering material only, may be economically extended to a value to which no artificial tooth produced according to prior art may reach.

The method according to one embodiment of my invention, for producing an artificial tooth of type above described and shown in Figs. 1 and 2 and whose advantages have been above explained, will be hereinafter made apparent by a consideration of the following description of the steps comprised in the method of this invention and characteristic features thereof. In said description, however, the several moulding steps, making steps and soldering steps will not be described in detail, in consideration of the fact that said steps are carried on by applying current knowledge in the art. Likewise the composition of porcelain and of the metal or metal alloys of which the tooth pins and the refractory anchorage members are made will not be indicated, said compositions and materials corresponding to those used in good artificial teeth currently produced.

The compound anchorage member to be embedded in the mass of porcelain tooth body prior to baking thereof, and forming the main characteristic feature of this invention and the most apparent means for providing the same, is preferably produced from a two-layer material of the type shown in Fig. 3. The said material is formed by the combination and by the superimposed relationship of one relatively thick layer 11a made of paper, for example, or of other relatively cheap material in sheet form which may be fully destroyed by the intense heat of the baking oven in which the porcelain body of the artificial tooth is to be baked, and of one extremely thin layer 9a made of precious refractory metal or metal alloy of the type currently used for producing conventional refractory anchorage members, of palladium, for example, or of platinum, or of gold-palladium or gold-platinum alloys.

The non-refractory, destructible and cheap layer 11a may be, say, 1/100 to 1/50 of an inch thick, and other thicknesses may be chosen according to the various requirements, the said thickness being not at all of significance in the cost of the produced articles, in view of the cheapness of the material. The metallic refractory layer 9a may be as thin as it may be produced by using the most advanced rolling or calendering processes and methods known in the art, layers 1/2000 of an inch having been satisfactorily produced and proved as fully meeting the requirements of this invention.

By using any conventional punching apparatus, from a compound material of the type above described and shown in Fig. 3 anchorage compound members of the type shown in Figs. 2 and 4 may be easily produced in the illustrated cup-shape. Other shaping may however be obtained, a conventional cup provided with an outturned flange forming an extension about its base, for example. Said compound anchorage comprises an outer stratum 9 of extreme thinness and made of refractory metal or metal alloy of the above type and an inner relatively thick stratum 11 made of paper or other non-refractory, destructible and cheap material.

During the shaping of said compound anchorage member by the punching step, the metallic side walls thereof become corrugated, owing to the contraction of the outer portion of the originally flat disk of the compound material (indicated by dotted lines in Fig. 3) from which each compound anchorage member is produced, the said outer portion being formed into a nearly cylindrical shape. The said inner stratum 11 of the compound anchorage member produced as above forms a cavity 12 which is of smaller, or at least not greater, diameter than the mouth 5 of the cavity of the porcelain tooth body in which said anchorage member is designed to fit.

From the above description another important advantage of the instant invention may be apparent to those skilled in the art. Owing to the superimposed relationship of said two layers 9a and 11a, the consequent close adherence of said layers prevents any damage to the extremely thin refractory metallic layer 9a, both in the handling of the material, and in the shaping thereof by the punching step, and also in the handling of the produced compound anchorage member, by the fact that the paper layer 11a adherent thereto will give proper consistency and strength to the whole compound material.

Referring now to Fig. 5: having an anchorage member of compound type thus produced, the said member is fitted about the top of a conventional supporting pin 13 made integral with member 14 of a conventional two-member mold, the members 14 and 15 of which in counterposed relationship provide the cavity in which the mass 1' of the not yet baked porcelain material is shaped into the desired form of the porcelain tooth body 1, according to current practice in the art. The fore end portion of said supporting pin 13 is nearly cylindrical and dimensioned to fit into said cavity 12 of the compound anchorage member (see Fig. 4) and the base portion of said supporting pin (i. e. the portion comprised between the fore end portion fitting inside the compound anchorage member and the bottom wall of member 14 of the mold) is designed to shape the mouth 5 of the cavity of the porcelain tooth body 1 in which the said anchorage member is embedded. According to current practice, most artificial teeth produced are provided with two parallel tooth pins and thereby the mold comprises two supporting pins 13, positioned side by side. In the several figures of the accompanying drawings the produced artificial tooth and the means for producing same are shown in a sectional view through one of said pins, the description with reference to said one pin and to its respective anchorage member corresponding to the other ones, not shown.

The not yet baked artificial tooth according to my invention as produced in said mold appears as shown in sectional view in Fig. 6, from which it will be seen that the tooth-shaped unbaked porcelain tooth body 1'' encases the anchorage member still comprising both its inner stratum 11 of cheap non-refractory material and its outer extremely thin stratum 9 of precious refractory metal or metal alloy, the said inner relatively thick stratum 11 acting as a support for the thinnest outer stratum 9 of refractory material as to resist compression thereof during said forming step between members 14 and 15 of the mold.

As shown in Fig. 6, an unbaked porcelain mass 1'' of an artificial tooth according to this invention extends inwardly about mouth 5 well over the outer portion of the embedded anchorage compound member, thus the minor diameter of said mouth 5 is substantially less than the external diameter of the said compound anchorage member, while the inner diameter of cavity 12 thereof is less than said minor diameter of said mouth 5 of the cavity. In such form, the artificial tooth according to the invention is introduced in the porcelain baking oven of any conventional type currently used in the art and baked therein.

During the baking step, the intense heat of the baking oven causes the destruction of the inner stratum 11 of paper or other like cheap and destructible material, and the same article as extracted from said baking oven upon completion of said baking step appears in its final condition as shown in Fig. 7, wherein the inner surface of the metallic refractory outer stratum 9 is uncovered, forming a metallic wall of a cavity 16 the inner diameter of which is substantially larger than the said minor diameter of the mouth 5 of same cavity. Further, the corrugated surface of the metallic stratum 9 is quite adherent to the mass of porcelain tooth body 1 compressed and baked thereabout.

At this point, the artificial tooth according to the invention and produced as above described and shown in Fig. 7 is now ready to receive a tooth pin 2 in any metallic-walled cavity 16 provided therein. As will be readily understood by a consideration of said Fig. 7 in conjunction with Fig. 2, into said cavity 16 a tooth pin 2 is inserted, the said pin 2 being of diameter substantially less than the minor diameter of mouth 5, for allowing free introduction of the said pin and of the soldering material, silver for example, into said cavity. Owing to the oxidation-resisting characteristics of the refractory material forming the coating stratum 9 of said cavity 16, as said soldering material fuses inside said cavity, by applying proper heat, said soldering material may be made integral with said non-oxidized coating stratum and with the fore end portion of tooth pin 2, the soldering material in fused form easily flowing in the space between the metallic walls of said cavity 16 and the outer surface of said fore end portion of pin 2, to form the intermediate stratum 10 of Fig. 2 and the enlarged anchoring part 4 of Fig. 1, deeply embedded and radially extended within the porcelain mass of tooth body 1.

In other words, the above described method may be summarized as a cycle of production of dental articles of the character described in which cycle are comprised the steps of producing an anchoring member of relatively great thickness, by a combination of an outer stratum of refractory precious metallic material and of an inner stratum of non-precious and non-refractory material, which forms most of said thickness, of embedding said member in the porcelain mass of tooth body by taking advantage of said thickness thereof for having the same deeply expanded inside said mass, of causing the removal of said inner cheap stratum for having the inner surface of said outer metallic stratum uncovered, and of connecting by a soldering step the fore end portion of a tooth pin to said inner surface.

It is apparent, therefore, that I have provided a novel artificial tooth which is provided with one or more tooth pins designed to resist the severe stresses tending to draw them out, in view of the extremely firm anchorage provided by the described provision of a well expanded anchoring part deeply embedded in the porcelain tooth body, and which may be economically produced, without loss in efficiency, in view of the very small amount of precious refractory metal or metal alloy used to form a metallic wall of the cavity or cavities in which said tooth pins are soldered. The said artificial tooth, however, may be produced by applying current knowledge in forms other than the one described, as will be apparent to those skilled in the art. For example, while the artificial tooth according to the invention is shown in the general shape of an "incisive" tooth, equivalent artificial teeth may be produced, according to request, in form of "eye-teeth" or of "grinding" teeth, and in such cases the number, position and direction of the tooth pins may be modified and substituted in various manners to meet best the requirement of sure connection with the vulcanite or other dental base material.

Further, the several steps of the described method for producing said artificial tooth or equivalent ones thereof may be variously modified and substituted without departing from the spirit and the scope of my invention. For example, while I have described the use of a non-heat-resisting material for providing the destructible inner stratum of the compound anchorage member and the use of the same intense heat of the baking oven for destroying the same, other methods may be provided, say, the use of an acid or of a corrosive liquid substance for removing said stratum prior to the baking step or for eliminating the material which may remain in the cavity upon said baking step, provided that said acid or substance is not active in relation with the porcelain and the refractory metal or metal alloy. Said modifications, alterations and substitutions should be therefore comprehended within the range of equivalents of my invention, as defined in and by the appended claims.

What I claim as new and desire to have protected by Letters Patent of the United States of America is:

1. The method for producing artificial teeth having a baked porcelain body and metallic tooth pins extending therefrom and provided with an enlarged anchoring part made integral with the fore end portion thereof and embedded inside said porcelain tooth body, the said method comprising the step of producing hollow compound cup-shaped anchoring members by punching an originally flat compound material formed by the combination of an extremely thin sheet of precious refractory metallic material and of a superimposed relatively thick sheet of cheap material, of embedding said cup-shaped members in said porcelain tooth body prior to baking, of baking said body having said compound cup-shaped members therein, of removing the said cheap material to have the inner surface of said thin metallic sheet in cup-shaped form uncovered, of introducing the fore end portion of said tooth pins in the space confined within said inner surface and of connecting said fore end portion to said thin metallic sheet by a soldering step.

2. The method for producing artificial teeth having a baked porcelain body and metallic tooth pins extending therefrom and provided with an enlarged anchoring part made integral with the fore end portion thereof and embedded inside said porcelain tooth body, the said method comprising the steps of producing hollow compound cup-shaped anchoring members by punching an originally flat compound material formed by the combination of an $\frac{1}{1000}$ to $\frac{1}{2000}$ of an inch thick sheet of precious refractory metallic material and of a superimposed $\frac{1}{50}$ to $\frac{1}{100}$ of an inch thick sheet of chartaceous material, of embedding said cup-shaped members in said porcelain tooth body prior to baking, of causing the destruction of said chartaceous material by intense heat during the baking step of porcelain to have the inner surface of said metallic sheet in cup-shaped form uncovered, of introducing the fore end portion of said tooth pins in the space confined within said inner surface and of connecting said fore end portion to said thin metallic sheet by a soldering step.

References Cited in the file of this patent

UNITED STATES PATENTS

| 859,335 | Ramsperger | July 9, 1907 |
| 1,298,419 | Summy | Mar. 25, 1919 |
| 1,353,199 | Whitley, Jr. | Sept. 21, 1920 |

FOREIGN PATENTS

| 779 | Great Britain | Jan. 11, 1906 |